United States Patent Office 3,655,760
Patented Apr. 11, 1972

3,655,760
CYCLIC PROCESS FOR THE PREPARATION OF AN OXIME FROM A HYDROXYLAMMONIUM SALT SOLUTION
Abraham H. de Rooij, Gellen, and Jan Elemndorp, Brunssum, Netherlands, assignors to Stamicarbon N.V., Heerlen, Netherlands
Filed Nov. 12, 1969, Ser. No. 875,724
Claims priority, application Netherlands, Nov. 12, 1968, 6816074
Int. Cl. C07c 131/00; C01c 1/28; C01b 21/40
U.S. Cl. 260—566 A
3 Claims

ABSTRACT OF THE DISCLOSURE

A cyclic process for the preparation of an oxime from a ketone and a hydroxylammonium salt is disclosed in which an aqueous acid reaction medium is circulated between a hydroxylammonium salt synthesis zone wherein nitrate ions are catalytically reduced to form a hydroxylammonium salt in the aqueous acid reaction medium, and an oxime synthesis zone wherein the hydroxylammonium salt is reacted with ketone to form an oxime. The nitrate ions reduced in the hydroxylammonium salt synthesis zone are replenished by the absorption of nitrous gases in the aqueous acid reaction medium resulting in formation of nitric acid.

---

Figure 1:
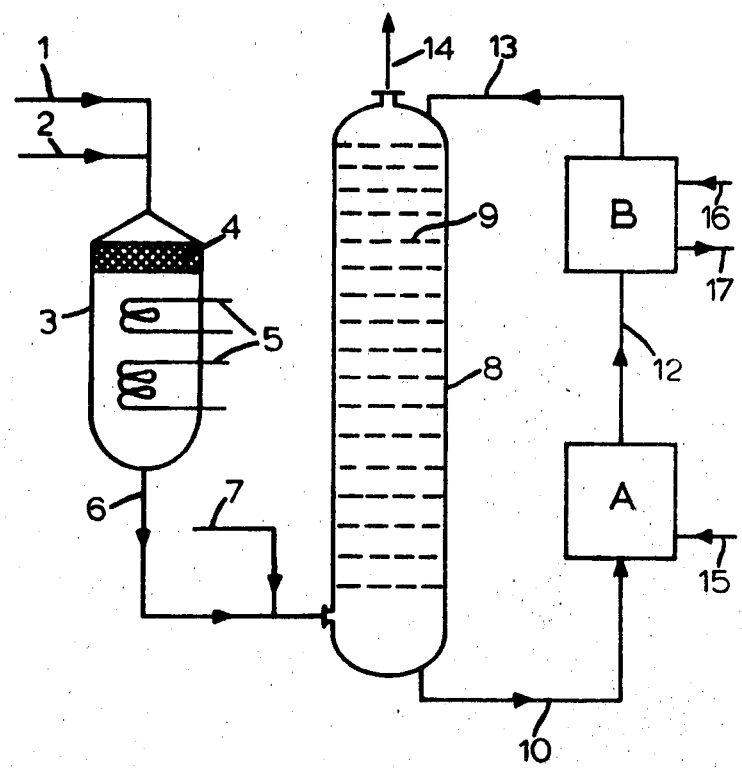

The present invention relates to an improvement of a cyclic process for the preparation and processing of a hydroxylammonium salt solution.

As is known, an important use to which hydroxylammonium salts are put is the preparation of oximes from ketones, in particular the preparation of cyclohexanone oxime from cyclohexanone.

In a known cyclic process for the preparation of cyclohexanone oxime an aqueous acid and buffered reaction medium containing buffer acids or salts that can be considered as acids—e.g. phosphoric acid or bisulphate—and salts derived from these acids, is kept in circulation through a zone for the synthesis of a hydroxylammonium salt, in which nitrate ions are catalytically reduced to hydroxylamine by means of molecular $H_2$, and through a zone in which oxime is synthesized. Before this circulating aqueous reaction medium is fed into the zone for the synthesis of the hydroxylammonium salt, the nitrate ions consumed are added to the generally in the form of nitric acid of ca. 60% by weight strength.

The resulting hydroxylamine combines with free buffer acid present to form the corresponding hydroxylammonium salt, and the resulting solution containing hydroxylammonium salt is fed into the oxime-forming zone, where the hydroxylammonium salt reacts with a ketone to form the corresponding oxime and free acid.

After the oxime has been removed from the aqueous reaction medium, the latter is returned to the zone in which hydroxylammonium salt is synthesized.

The chemical reactions taking place in the successive process stages can be rendered by the following equations, which represent an example:

(1) formation of hydroxylammonium salt:

$2H_3PO_4 + NO_3^- + 3H_2 \rightarrow NH_3OH^+ + 2H_2PO_4^- + 2H_2O$ (2) rearrangement to oxime (using e.g. cyclohexanone).

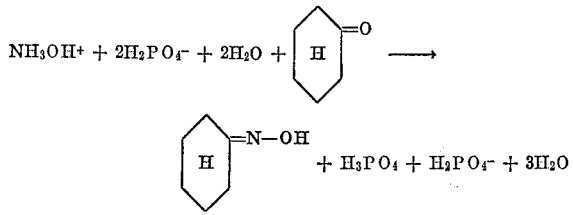

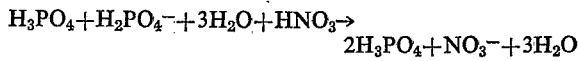

(3) replacement, as $HNO_3$, of nitrate ions consumed, after removal of oxime formed:

$H_3PO_4 + H_2PO_4^- + 3H_2O + HNO_3 \rightarrow$
$2H_3PO_4 + NO_3^- + 3H_2O$

The solution resulting after this addition of $HNO_3$ will—following removal of both the water formed in the reaction and the water introduced in the nitric acid supplied—in theory have the same composition as the starting solution used for the formation of the hydroxylammonium salt.

The addition of nitric acid brings the disadvantage of an amount of water being introduced into the circulating reaction medium together with the nitric acid, which amount has afterwards to be removed by evaporation.

There is also the possibility that together with the nitric acid—if this is not of very high purity—heavy metals are brought into the circulating reaction medium, which heavy metals can poison the costly palladium catalyst used in the catalytic reduction of nitrate ions with hydrogen, with the result that the catalyst must be replaced prematurely.

These drawbacks are obviated in that, according to the present invention, the nitrate ions are introduced into the circulating reaction medium not by adding nitric acid to this medium, but by providing that nitric acid is formed in the medium by absorption of nitrous gases.

Actually, the process according to the invention amounts to the full combination of a nitric acid plant with the cyclic process, NO obtained by combustion of ammonia being air-oxidized to $NO_2$ and this $NO_2$ being absorbed by the circulating reaction medium supplied to an absorption system, which results in the formation of $HNO_3$.

In addition to the advantages mentioned above, this combination of the nitric acid preparation with the cyclic process for hydroxylamine synthesis has some other advantages, viz:

(a) Since, in contrast with the situation in a normal nitric acid preparation, a dilute nitric acid solution is now prepared instead of a solution of highest possible concentration, and since the amount of absorption liquid available per mole of $NO_2$ to be absorbed is many times larger than the amount normally available in the nitric acid preparation (with 60% wt. $HNO_3$, slightly less than 3 moles of $H_2O$ per mole of $NO_2$), it is now possible to achieve practically complete absorption at a temperature much higher than that usually applied in the normal nitric acid preparation.

This results in a considerable decrease of the investment in equipment in comparison with the cost of a normal nitric acid plant of the same capacity.

Notably, the normally-used cooler for hot gases, as well as the oxidation column, which are both interposed between the $NH_3$-combustion vessel and the absorption columns, can now be omitted.

(b) There is the possibility of an improved water economy, since now the reaction water coming available in the formation of the hydroxylammonium salt and in the rearrangement to oxime need no longer be removed from the circulating liquid in a special evaporation step, but can be evaporated automatically in the formation of nitric acid from NO. In an absorption at atmospheric pressure such absorption temperatures may be chosen—temperatures between 70 and 80° C.—that the waste gas freed of nitrous gases, which includes the evaporated process water, is not yet or only just saturated in water vapour.

The sensible heat of the gas to be absorbed, the heat of oxidation released in the oxidation of NO to $NO_2$, and the heat released in the formation of nitric acid from $NO_2$ and water, appear to be more than sufficient for evaporating the water formed in the process. Should it appear that in this way more water than necessary is removed from the circulating liquid, this can be remedied in a simple way by lowering the absorption temperature or by supplying water to the circulating liquid enriched in nitric acid, which issues from the absorption column.

(c) The absorption of nitrous gases in the circulating reaction medium can be put to use in the decomposition of $NH_4^+$ ions, which, as is known, may be formed, in addition to hydroxylammonium ions, by a continued reduction of the nitrate ions, in amounts corresponding to 5–20% of the available nitrate ions, depending on the reaction conditions.

The decomposition of the $NH_4^+$ ions proceeds according to the equation

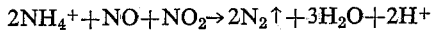

$$2NH_4^+ + NO + NO_2 \rightarrow 2N_2\uparrow + 3H_2O + 2H^+$$

The reaction rate depends on the temperature; in a strongly acid medium the decomposition proceeds rather rapidly at a temperature of only 40° C., whereas at 20° C. hardly any decomposition takes place. If the buffer acids in the circulating reaction medium are in a form other than ammonium salts—e.g. in the form of alkali salts—all of the $NH_4^+$ ions present in the circulating liquid will originate from reduced nitrate ions; if the composition of the reaction medium for the hydroxylammonium salt synthesis is to be kept constant, these $NH_4^+$ ions will have to be broken down.

This can be done by contacting all of the circulating liquid with a counter-current stream of nitrous gases in an absorption zone, in which the nitrous gases are absorbed at a comparatively high temperature, e.g. a mean temperature of 75° C.

However, if the reaction medium to be kept circulating contains buffer salts in the form of $NH_4^+$ salts, so that the number of $NH_4^+$ ions to be broken down is only a fraction of the total number, a part-stream branched off from the circulating liquid can be contacted with nitrous gases in a high-temperature absorption zone, the remainder of the circulating nitrous gases being absorbed at a relatively low temperature in a second absorption zone.

In the high-temperature absorption zone the decomposition of $NH_4^+$ predominates, whereas in the other absorption zone mainly nitric acid formation takes place.

In the last mentioned procedure, it is impossible—owing to the absorption taking place at a relatively low temperature—for all of the water formed in the synthesis of the hydroxylammonium salt and the oximation to be evaporated during the contact of the circulating liquid with the nitrous gases, so that extra provisions will have to be made for the evaporation of the non-evaporated remainder.

Figure 2:
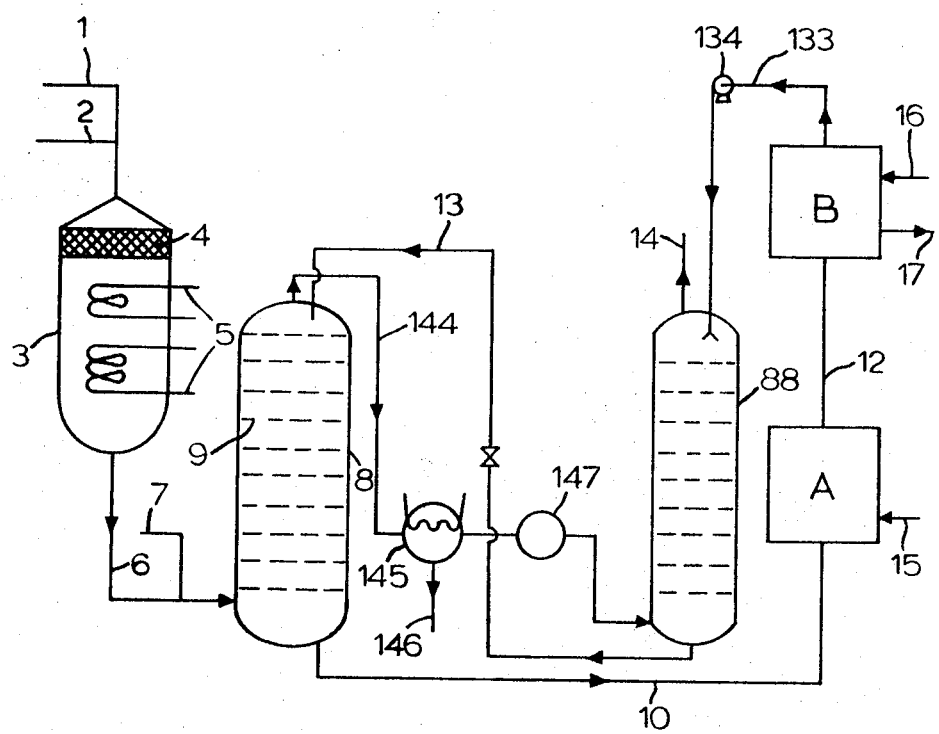
Figure 3:
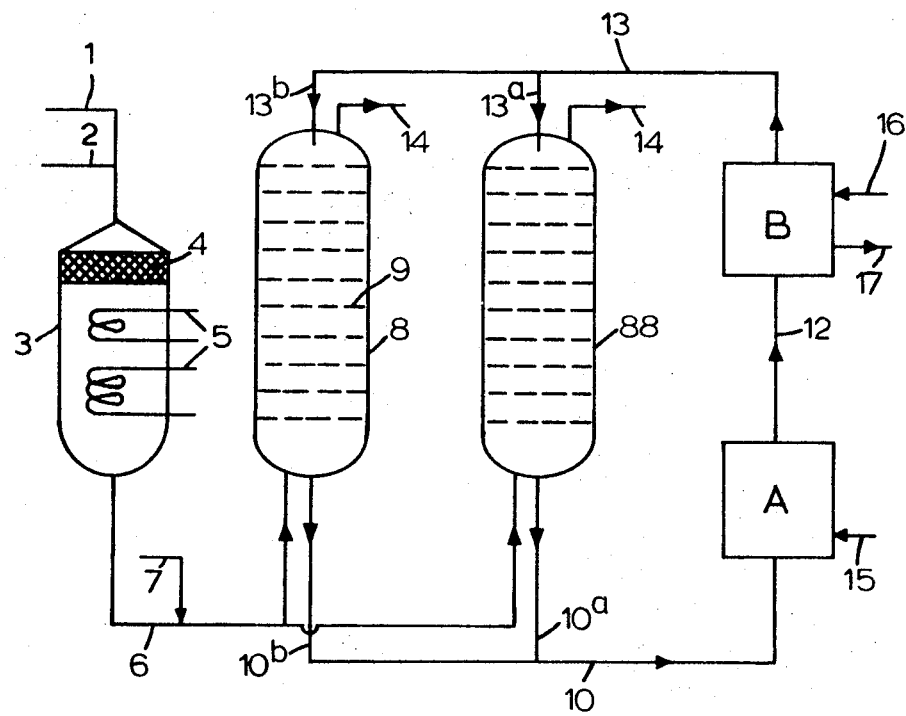

The practice of the process according to the present invention are shown diagrammatically in FIGS. 1, 2 and 3.

The process according to FIG. 1 relates to absorption at atmospheric pressure and elevated temperature, with all of the circulating liquid current being contacted in counter-current relation with nitrous vapours.

The procedure of FIG. 2 relates to a process with partial atmospheric absorption and, in addition, pressurized absorption for the yet unabsorbed remainder of the nitrous vapours.

As compared with the first procedure, this brings a saving in investment in absorption columns, since for pressurized absorption these may be made considerably smaller, but on the other hand there are additional investment costs for a cooler and a compressor, which have to be used to condense water vapour from the gases to be compressed and to compress these gases.

FIG. 3 shows a procedure in which both the circulating liquid and the gas stream containing nitrous gases are branched, and in which absorption is effected in two separate absorption systems; the one system operates at a relatively high temperature, in the order of 70–80° C., which is favourable for the decomposition of $NH_4^+$ ions, the other absorption system operates at a low temperature, preferably below 25°, which favours the formation of nitric acid. In the procedure represented in FIG. 1, a conduit 1 supplies an $NH_3$ current, and a conduit 2 supplies air to a combustion vessel 3, in which the $NH_3$ is burnt over platinum gauze 4 at atmospheric pressure and at a temperature of ca. 850–950° C., according to the equation:

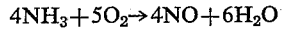

$$4NH_3 + 5O_2 \rightarrow 4NO + 6H_2O$$

The combustion gases give off heat to cooling tubes 5, in which water is converted into steam, which is then passed, at a temperature of, say 150–200° C., through conduit 6, mixed with secondary air supplied through conduit 7 for the oxidation of NO to $NO_2$, and fed into the absorption system 8, which is equipped with screening plates 9. The figure shows the absorption system as one absorption column, but in pactice it will generally consist of several series-connected columns equipped with plates or packing bodies.

The absorption liquid is the acid buffered reaction medium, which is circulated through zone A, in which the synthesis of the hydroxylammonium salt takes place, conduit 12, oximation zone B, conduit zone 13, absorption system 8 and conduit 10.

As a result of the absorption of nitrous gases and the decomposition of $NH_4^+$ ions, a solution enriched in nitrate ions and hydrogen ions, but made poorer in $NH_4^+$ ions flows through conduit 10 and into zone A for the synthesis of the hydroxylammonium salt. In this zone the nitrate ions are catalytically reduced by means of $H_2$ supplied through conduit 15, to form hydroxylamine and ammonia, which reacts with free buffer acid to form the corresponding hydroxylammonium and ammonium salts.

In the oximation zone, B, the resulting hydroxylammonium salts are contacted with a ketone or an aldehyde supplied through conduit 16, to be converted into the corresponding oxime, in which process acid is released; the resulting oxime is removed through conduit 17.

In absorption system 8 the $NH_4^+$ ions formed in zone A per unit time are broken down, and the nitrate ions consumed in zone A are replaced again by absorption of nitrous gases. A gas stream practically freed of nitrous gases, and mainly consisting of $N_2$ and $H_2O$, leaves the absorption system through conduit 14.

The procedure according to FIG. 2 differs from that represented by FIG. 1 in that the combustion of the ammonia and the absorption in absorption system 8 take place at atmospheric pressure; the non-absorbed gas stream, which still contains $NO+O_2$, is sent through conduit 144 and into a condenser 145, where cooling causes a large portion of the water vapour present to condense; the condensate—a highly dilute solution of nitric acid (ca. 0.5% by weight)—is removed from the system through conduit 146. Then, the gas stream, which has become poorer in water vapour, is subjected to a pressure of some atmospheres—say, 3–7 atm.—in compressor 147 and next sent to a second absorption system, 88, where it is again subjected to absorption in a counter-current of circulating reaction medium supplied through conduit 133 and brought at the required pressure by pump 134. From the bottom of system 88 the absorption liquid is discharged through a conduit 13 equipped with an expansion valve, after which the liquid is fed into the top of absorption system 8.

A gas stream practically free of nitrous gases is discharged from the system through conduit 14.

As compared with the procedure according to FIG. 1, that represented by FIG. 2 has the advantage that the investment required for absorption zones 8 and 88 of FIG. 2 is less than the investment in absorption zone 8 of FIG. 1.

On the other hand, there is the extra investment in cooler 145 and compressor 147.

It is clear now that the procedures according to FIGS. 1 and 2 are suited for the absorption of nitrous gases in a liquid reaction medium containing the buffer salts not in the form of ammonium salts, but, for instance, as alkali salts. In this case all of the $NH_4^+$ ions present—i.e. the $NH_4$ ions formed in the reduction of nitrate ions in zone A—are broken down.

The procedure according to FIG. 3 relates to the absorption of nitrous gases in a reaction medium containing the buffer salts in the form of ammonium salts, so that, per unit time, for instance only 2–10% of the total amount of $NH_4^+$ ions present have to be broken down.

To this end the stream coming from oximation zone B through conduit 13 is split into part-streams 13a and 13b, which are related as the amount of $NH_4^+$ to be broken down to the amount of $NH_4^+$ to be kept intact.

If part of stream 13a contains the amount of $NH_4^+$ to be broken down, absorption system 88, to which part stream 13a is supplied as the absorbent, is kept at such a temperature that in the absorption of nitrous gases mainly the $NH_4^+$ ions are broken down.

In absorption system 8 absorption of nitrous gases takes place in an absorbent formed by part current 13b, at such a low temperature that there is hardly any breakdown of $NH_4^+$ ions.

The liquids enriched in nitric acid, which are to be discharged from the bottoms of absorption systems 8 and 88, are supplied to collecting conduit 10 through conduits 10b and 10a, and are thereafter supplied to zone A for the hydroxylammonium salt synthesis.

The invention will be elucidated in the following example, which relates to a procedure as represented in FIG. 1.

An absorption liquid of the following composition (moles):

| | |
|---|---|
| $NH_4NO_3$ | 1 |
| $NaNO_3$ | 119 |
| $NaH_2PO_4$ | 80 |
| $NH_4H_2PO_4$ | 8 |
| $H_3PO_4$ | 112 |
| $H_2O$ | 3460 | supplied from oximation zone B was contacted, in absorption system 8, with an NO-containing counter-current gas stream of the following composition (moles):

| | |
|---|---|
| NO | 88 |
| $N_2$ | 758 |
| $O_2$ | 88 |
| $H_2O$ | 155 |

The temperature of the inflowing nitrous vapours was 150° C., the temperature of the waste gas removed through conduit 14 amounts to 78° C. The temperature of the issuing liquid, which has become enriched in nitric acid, was 73° C., and the composition of this liquid was (moles):

| | |
|---|---|
| $NH_4NO_3$ | 1 |
| $NaNO_3$ | 119 |
| $NaH_2PO_4$ | — |
| $NH_4H_2PO_4$ | — |
| $H_3PO_4$ | 200 |
| $H_2O$ | 3000 |

What is claimed is:

1. In a cyclic process for the preparation of an oxime from a ketone and a hydroxylammonium salt in which an aqueous acid reaction medium is circulated between
    a hydroxylammonium salt synthesis zone wherein nitrate ions are catalytically reduced with molecular hydrogen to form hydroxylamine, which hydroxylamine reacts with the acid of said aqueous acid reaction medium to form said hydroxylammonium salt; and
    an oxime synthesis zone wherein said hydroxylammonium salt is reacted with said ketone to form said oxime, the improvement consisting essentially in replenishing said nitrate ions reduced in said hydroxylammonium salt synthesis zone by the absorption of nitrous gases, resulting in the formation of nitric acid in said circulating aqueous acid reaction medium.

2. In a cyclic process for the preparation of an oxime from the reaction of a ketone with a hydroxylammonium salt in which an aqueous acid reaction medium is circulated between
    a hydroxylammonium salt synthesis zone wherein nitrate ions are catalytically reduced with molecular hydrogen to form hydroxylamine and by-product ammonium ions, said hydroxylamine reacting with the acid of said aqueous acid reaction medium to form said hydroxylammonium salt;
    and an oxime synthesis zone wherein said hydroxylammonium salt is reacted with said ketone to form said oxime, the improvement consisting essentially in absorbing nitrous gases in said aqueous acid reaction medium in two absorption stages,
    one of said absorption stages operating at a temperature of at least 40° C. whereby said by-product ammonium ions react with said absorbed nitrous gases to form nitrogen, and
    the other of said absorption stages operating at a temperature less than 40° C. whereby said nitrate ions reduced in said hydroxylammonium salt synthesis zone are replenished by the absorption of said nitrous gases resulting in the formation of nitric acid in said circulating aqueous acid reaction medium.

3. The process of claim 2 wherein said one of said absorption stages operates at a temperature of 70° to 80° C. and said other of said absorption stages operates at a temperature no higher than 25° C.

References Cited

UNITED STATES PATENTS 2,797,144   6/1967   Joris _____ 23—190 A X

EARL C. THOMAS, Primary Examiner

H. S. MILLER, Assistant Examiner

U.S. Cl. X.R.

23—103, 158, 190 A, 220